United States Patent
Jin et al.

(10) Patent No.: US 8,688,804 B2
(45) Date of Patent: Apr. 1, 2014

(54) APPARATUS AND METHOD FOR TRANSMITTING SOUND INFORMATION IN WEB-BASED CONTROL SYSTEM

(75) Inventors: Ho Jin, Yongin-gi (KR); Jung-yon Cho, Suwon-si (KR); Jong-wook Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1395 days.

(21) Appl. No.: 11/516,622

(22) Filed: Sep. 7, 2006

(65) Prior Publication Data
US 2007/0073424 A1 Mar. 29, 2007

Related U.S. Application Data (60) Provisional application No. 60/719,971, filed on Sep. 26, 2005, provisional application No. 60/750,810, filed on Dec. 16, 2005.

(30) Foreign Application Priority Data

Apr. 5, 2006 (KR) .................. 10-2006-0031155

(51) Int. Cl.
G06F 15/16 (2006.01)
G06F 15/173 (2006.01)

(52) U.S. Cl.
USPC ............................ 709/218; 709/203; 709/224

(58) Field of Classification Search
USPC ....................................................... 709/218
See application file for complete search history.

(56) References Cited

U.S. PATENT DOCUMENTS

| 5,903,727 | A | * | 5/1999 | Nielsen ......................... 709/212 |
| 6,198,479 | B1 | * | 3/2001 | Humpleman et al. ......... 715/733 |
| 6,300,966 | B1 | * | 10/2001 | Gregory et al. ............... 345/736 |
| 6,643,621 | B1 | | 11/2003 | Dodrill et al. |
| 6,766,298 | B1 | * | 7/2004 | Dodrill et al. .............. 704/270.1 |
| 6,968,294 | B2 | * | 11/2005 | Gutta et al. .................... 702/188 |
| 7,234,115 | B1 | * | 6/2007 | Sprauve et al. ............... 715/746 |
| 2002/0035404 | A1 | * | 3/2002 | Ficco et al. ..................... 700/65 |
| 2002/0046403 | A1 | * | 4/2002 | Kim et al. ....................... 725/37 |
| 2003/0131065 | A1 | | 7/2003 | Neufeld et al. |

(Continued)

FOREIGN PATENT DOCUMENTS

| JP | 9-258736 A | 10/1997 |
| JP | 2001-521642 A | 11/2001 |

(Continued)

OTHER PUBLICATIONS

Communication issued by Canadian Patent Office on May 4, 2011 in counterpart Canadian Application No. 2,560,783.

Primary Examiner — Oscar Louie
Assistant Examiner — Lin Liu
(74) Attorney, Agent, or Firm — Sughrue Mion, PLLC (57) ABSTRACT

Disclosed are an apparatus and method for transmitting information in a Web-based control system. The control target device of the present invention includes a Web server module, a sound information generation module and an independent communication module. The Web server module transmits a Web page required for device control to a control device through a first communication channel. The sound information generation module generates sound information related to an event, occurring according to variation in status of the control target device. The independent communication module transmits the generated sound information to the control device through a second communication channel that is separate from the first communication channel.

17 Claims, 6 Drawing Sheets

(56) References Cited

U.S. PATENT DOCUMENTS

| | | | |
|---|---|---|---|
| 2003/0217110 A1* | 11/2003 | Weiss | 709/207 |
| 2004/0042470 A1* | 3/2004 | Cooper et al. | 370/401 |
| 2004/0054789 A1* | 3/2004 | Breh et al. | 709/229 |
| 2005/0050167 A1* | 3/2005 | Kim et al. | 709/218 |
| 2005/0091404 A1* | 4/2005 | Chevanne et al. | 709/246 |
| 2005/0120132 A1* | 6/2005 | Hutter | 709/234 |
| 2005/0162273 A1* | 7/2005 | Yoon et al. | 340/539.14 |
| 2005/0198063 A1* | 9/2005 | Thomas et al. | 707/102 |
| 2005/0203647 A1* | 9/2005 | Landry et al. | 700/83 |

FOREIGN PATENT DOCUMENTS

| | | |
|---|---|---|
| JP | 200273842 A | 3/2002 |
| JP | 200470780 A | 3/2004 |
| JP | 2005201596 A | 7/2005 |
| KR | 1020050018317 A | 2/2005 |
| KR | 1020050078518 A | 8/2005 |
| WO | 2005015824 A1 | 2/2005 |

* cited by examiner

```
<Event>
    <DeviceID>UUID of DVD Device</DeviceID>
    <EventID>DiskUnreadable</EventID>
    <EventType>Sound Notification</EventType>
    <SoundData type= "url" >
        <SourceData Length = "124" type = "audio/mpeg"
            url = "192.10.10.1/DVD/DiskUnreadable.mp3">
        </SourcrData>
    </SoundData>
</Event>
```

FIG. 5B

```
<Event>
    <DeviceID>UUID of DVD Device</DeviceID>
    <EventID>EjectDisk</EventID>
    <EventType> Sound Notification</EventType>
    <SoundData type= "Binary" >
        <SourceData Length = "124" encode = "base64" >
        ############## Binary Data ##############
        </SourcrData>
    </SoundData>
</Event>
```

APPARATUS AND METHOD FOR TRANSMITTING SOUND INFORMATION IN WEB-BASED CONTROL SYSTEM

CROSS-REFERENCE TO RELATED APPLICATIONS

This application claims priority from Korean Patent Application No. 10-2006-0031155 filed on Apr. 5, 2006 in the Korean Intellectual Property Office, and U.S. Provisional Patent Application No. 60/719,971 filed on Sep. 26, 2005 and 60/750,810 filed on Dec. 16, 2005 in the United States Patent and Trademark Office, the disclosures of which are incorporated herein by reference in their entirety.

BACKGROUND OF THE INVENTION

1. Field of the Invention

The present invention relates to the transmission of sound information in a system for controlling devices located in a remote place using a Web browser (hereinafter referred to as a 'Web-based control system') and, more particularly, to a method that transmits sound information, corresponding to an occurring event, to a control device when the event occurs in the control target device of a Web-based control system.

2. Description of the Related Art

Generally, a home network system can be implemented in the form of a system for controlling other devices based on the Web.

For example, a home network system can be implemented in such a way that a Web browser is installed in a digital television, and a user controls another device connected to the digital television, for example, a Digital Versatile Disc (DVD) player, through the Web browser, using a remote controller.

That is, in order to control several devices constituting the home network system (hereinafter referred to as 'control target devices'), the Web browser is installed in each device having a user interface, such as a digital television or a Personal Digital Assistant (PDA), and is connected to each Web server provided in another device, so that control target devices may be controlled.

Figure 1:
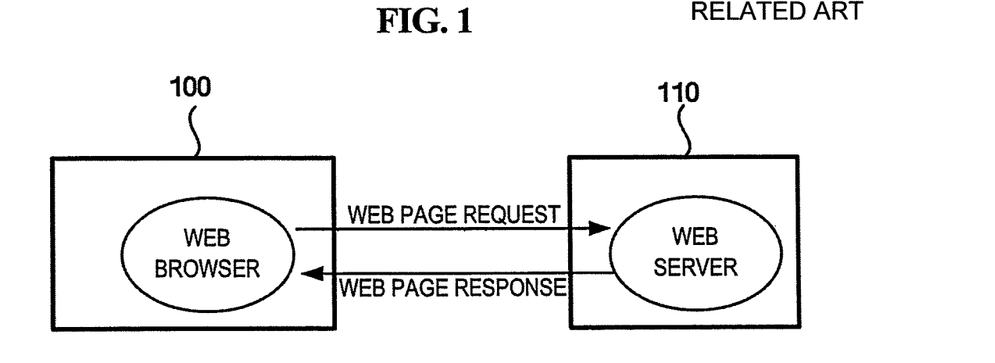
FIG. 1 illustrates an example of a conventional method of controlling a control target device using a Web browser.

FIG. 1 illustrates a method of controlling a control target device using a Web browser, as described above.

Referring to FIG. 1, a conventional Web-based control system includes a control device 100 and a control target device 110. The control device 100 is provided with a Web browser for controlling the control target device 110, such as a digital television or a PDA. The control target device 110 may be provided with a Web server for receiving a request from the control device 100 through a Hypertext Transfer Protocol (HTTP), processing the request, and transmitting processing results to the control device 100 using HTTP.

The Web browser of the control device 100 transmits a request to the Web server using HTTP, and receives a response to the request.

First, a user executes the Web browser installed in the control device 100, and accesses the Uniform Resource Locator (URL) of the control target device 110 that is intended to be controlled through the Web browser. In this case, the Web browser is directly connected to the Web server of the control target device 110. The Web server of the control target device 110 transmits a corresponding homepage to the control device 100.

The user uses a control service provided by the control target device 110 in the homepage provided by the control target device 110 through the Web browser. For example, when a DVD player is the control target device 110, the user can execute a "PLAY" command through the Web browser of the control device 100.

The Web server calls the unique function of the device through a Common Gateway Interface (CGI), executes the user's command, and transmits the execution results to the control device 100. In this case, the results can be transmitted in the form of Hypertext Markup Language (HTML) code. The Web browser of the control device 100, having received the results, provides the corresponding results to the user.

The fact that a control command provided by the control target device intended to be controlled is executed through the homepage provided by the control target device using the Web browser is advantageous in that, even though the user does not know detailed information about the control target device, the user can control the control target device. However, there is a disadvantage in that, when an event occurs in the control target device due to another control device, or when an event occurs due to variation in the internal status of the control target device, the occurrence of the event cannot be detected. That is, in the homepage of the control target device, which has been loaded into the Web browser, variation in status caused by the occurrence of the event is not considered, so that the control target device may not operate normally. For example, if the control target device is in a stopped state when the homepage of the control target device is called, and is changed from the stopped state to a playing state by another control device, the control target device may actually change to a paused state even though the user clicks a play button on the homepage already loaded into the Web browser. Further, the occurrence of an event in the control target device cannot be detected, so there is no method of reloading the homepage of the control target device, loaded into the Web browser, and having the latest data.

In order to solve this problem, Korean Patent Laid-Open Publication No. 2005-0018317 discloses a method of easily controlling a control target device using a convenient method even though the detailed content of the control target device is not known, and of allowing a control device to easily detect the occurrence of an event when the event occurs in the control target device.

However, in this case, the control device can detect an event corresponding to variation in the status of the control target device, but a method of transmitting sound information, for example, a warning sound or an effect sound, when there is a necessity to transmit sound information, corresponding to the status variation of the control target device, to the control device, is not disclosed.

SUMMARY OF THE INVENTION

Accordingly, some aspects of the present invention have been made keeping in mind the above problems occurring in the prior art, and one aspect of the present invention is to provide a method that transmits sound information corresponding to an event to a control device, when an event corresponding to variation in status occurs in a control target device, in a Web-based control system, and an apparatus for performing the method.

In accordance with one aspect of the present invention, there is provided a control target device for transmitting sound information in a Web-based control system, the device including a Web server module transmitting a Web page required for device control to a control device through a first communication channel, a sound information generation module generating sound information related to an event occurring according to variation in status of the control target device, and an independent communication module transmitting the generated sound information to the control device through a second communication channel that is separate from the first communication channel.

In accordance with another aspect of the present invention, there is provided a control device for transmitting sound information in a Web-based control system, the device including a Web browser module receiving a Web page required to control a control target device through a first communication channel, an independent communication module receiving sound information related to an event occurring in the control target device through a second communication channel that is separate from the first communication channel, and a sound information processing module playing corresponding sound using the received sound information.

In accordance with a further aspect of the present invention, there is provided a method of transmitting sound information in a Web-based control system, the method including transmitting a Web page required for device control to a control device through a first communication channel, generating sound information related to an event occurring according to variation in status of a control target device, and transmitting the generated sound information to the control device through a second communication channel that is separate from the first communication channel.

In accordance with yet another aspect of the present invention, there is provided a method of transmitting sound information in a Web-based control system, the method including receiving a Web page required to control a control target device through a first communication channel, receiving sound information related to an event occurring in the control target device through a second communication channel that is separate from the first communication channel, and playing corresponding sound using the received sound information.

BRIEF DESCRIPTION OF THE DRAWINGS

The above and other aspects of the present invention will be more clearly understood from the following detailed description taken in conjunction with the accompanying drawings, in which.

DESCRIPTION OF EXEMPLARY EMBODIMENTS

Hereinafter, exemplary embodiments of the present invention will be described in detail with reference to the attached drawings.

Reference now should be made to the drawings, in which the same reference numerals are used throughout the different drawings to designate the same or similar components.

Exemplary embodiments of the present invention are described hereinafter with reference to flowchart illustrations of user interfaces, methods, and computer program products according to the exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute on the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which comprises one or more executable instructions for implementing the specified logical function(s). It should also be noted that, in some alternative implementations, the functions noted in the blocks may occur in a different order. For example, two blocks shown in succession may in fact be executed substantially concurrently, or the blocks may sometimes be executed in reverse order, depending upon the desired functionality.

Meanwhile, the term 'event' used in this detailed description to mean variation in the status of a control target device. Such variation in status may be variation in status caused by the control command of a control device, or may be variation in status occurring in the control target device itself. If the control target device is assumed to be a Digital Versatile Disc (DVD) player, it can be considered that the case where the DVD player starts play in response to a user's play command, or the case where a DVD is not inserted into the DVD-player and a play error occurs, corresponds to such an event.

Figure 2:
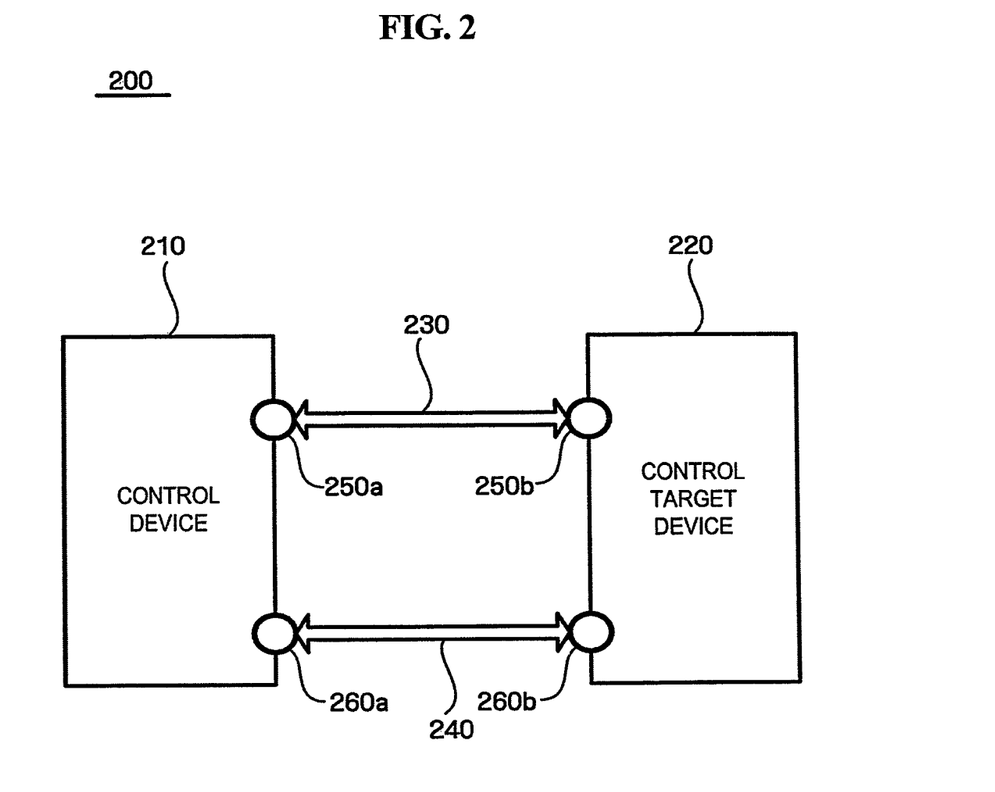
FIG. 2 illustrates an example of the construction of a Web-based control system according to an exemplary embodiment of the present invention.

FIG. 2 illustrates an example of the construction of a Web-based control system according to an exemplary embodiment of the present invention.

Referring to FIG. 2, a Web-based control system 200 includes a control target device 220 in which an event corresponding to the variation in status of the device occurs, and a control device 210 for controlling the control target device 220 and detecting the event occurring in the control target device 220. In this case, the Web-based control system 200 may include a plurality of control devices and a plurality of control target devices, but, for the convenience of description, only a single control device and a single control target device are shown in FIG. 2.

The control device 210 and the control target device 220 each generate two communication sockets and both form two communication channels through the generated communication sockets.

That is, a first communication channel 230 is formed between the first communication socket 250a of the control device 210 and the first communication socket 250b of the control target device 220, and a second communication channel 240 is formed between the second communication socket 260a of the control device 210 and the second communication socket 260b of the control target device 220.

The first communication channel 230 may be configured as a channel for allowing the control target device 220 to provide a Web page, required to control the control target device 220, to the control device 210, or allowing the control device 210 to transmit control information, required to control the control target device 220, to the control target device 220. For this operation, the first communication sockets 250a and 250b can be formed as Hypertext Transfer Protocol (HTTP) sockets.

The second communication channel 240 may be configured to transmit information about an event to the control device 210 when the event occurs in the control target device 220, or to transmit, in particular, sound information related to the occurring event, to the control device 210. In this case, the sound information includes a sound file, a predefined sound effect, or URL information related to sound.

The control device 210 is provided with a user interface screen using HTTP by the control target device 220 through the first communication channel 230. In this case, the user interface screen may be a corresponding Web page required to control the control target device 220. Therefore, the user can control the control target device 220 through the user interface screen. Control information required to control the control target device 220 is transmitted through the first communication channel 230. Since the control target device 220 provides the user interface screen, the control target device 220 can be considered to function as a remote user interface server and the control device 210 to function as a remote user interface client.

Meanwhile, when an event related to, in particular, sound, occurs in the control target device 220, the control target device 220 generates corresponding sound information, and transmits the sound information to the control device 210 through the second communication channel 240.

If the transmitted sound information has the format of a sound file, the control device 210 operates a software module capable of playing the sound file, whereas, if the sound information is a predefined sound effect or warning sound, the control device 210 outputs a corresponding sound effect or warning sound existing in the control device 210. Further, if the transmitted sound information is URL information related to sound, sound can be played using two methods. The first method is implemented in such a way that the control device 210 accesses a corresponding URL through the second communication channel 240, receives audio data, sound effects, warning sounds or voice data from the URL using an HTTP GET protocol, and plays the received data. The second method is implemented in such a way that the control device 210 receives sound-related URL information and transmits the URL information to a sound information processing module, and the sound information processing module accesses a corresponding URL, receives corresponding audio data from the URL using the HTTP GET protocol, and plays the audio data.

As described above, in order to operate the second communication channel 240 that is separate from the first communication channel 230, each of the control device 210 and the control target device 220 includes an independent communication module that is independently operated in each device to perform communication through the second communication channel 240. In particular, in the case of the control device 210, the Web browser can use a plug-in, an ActiveX object, a native object, etc. that support such a communication function. Since JavaScript cannot alone play sound, it calls a native object or a plug-in capable of playing sound, which then plays the sound.

Figure 3:
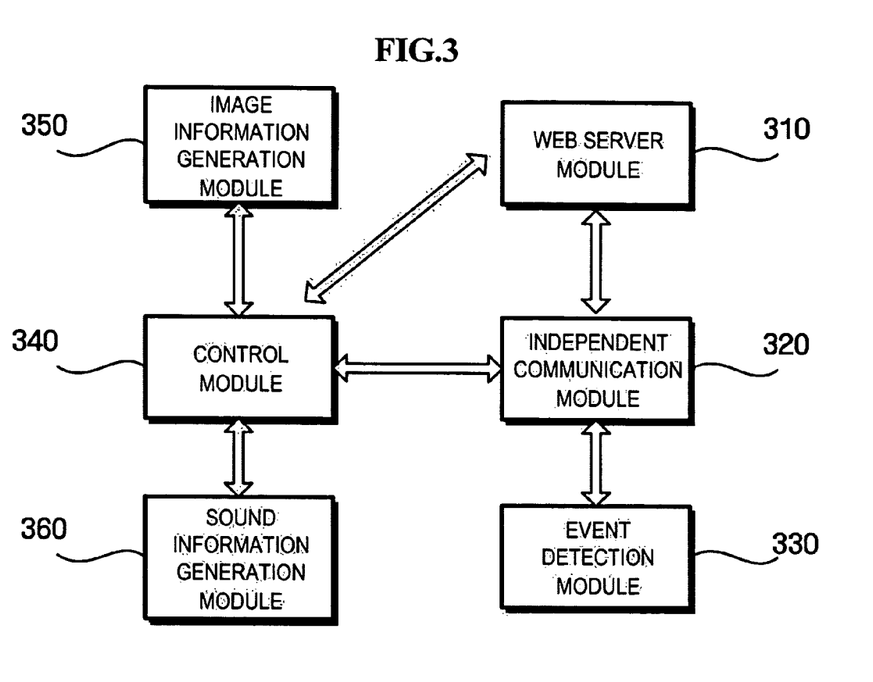
FIG. 3 is a block diagram showing the construction of a control target device according to an exemplary embodiment of the present invention.

FIG. 3 is a block diagram showing the construction of a control target device according to an exemplary embodiment of the present invention.

Referring to FIG. 3, the control target device according to an exemplary embodiment of the present invention includes a Web server module 310, an independent communication module 320, an event detection module 330, a control module 340, an image information generation module 350, and a sound information generation module 360.

The web server module 310 performs a request and a response using the Web browser of the control device and HTTP. The Web server module 310 includes a Common Gateway Interface (CGI) module, and interprets the request of the control device, which has been received through the Web.

The independent communication module 320 transmits sound information related to an occurring event to the control device using a communication channel that is separate from a communication channel formed by the Web server module 310. In this case, a sound file, an effect sound, a warning sound, or sound-related URL information can be transmitted.

The event detection module 330 detects an event, occurring according to the variation in status of the control target device, and transmits the detected event to the independent communication module 320.

The control module 340 takes charge of the function of controlling the entire control target device. Further, the control module 340 processes control information in response to the request of the control device, and notifies the independent communication module 320 or the Web server module 310 of the transmission of a user interface or sound information corresponding to the occurrence of an event when there is a need to transmit the user interface or the sound information.

The image information generation module 350 generates and manages image information to be transmitted to the control device.

The sound information generation module 360 generates and manages a sound file to be transmitted to the control device, and also manages a sound effect corresponding to the status of the control target device.

The term 'module', as used herein, means, but is not limited to, a software or hardware component, such as a Field Programmable Gate Array (FPGA) or Application Specific Integrated Circuit (ASIC), which performs certain tasks. A module may be configured to reside on the addressable storage medium and may be configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or may be further separated into additional components and modules. In addition, the components and the modules can be implemented to execute one or more Central Processing Units (CPUs) in a device or security multimedia card.

In order for the control target device to transmit a user interface, required to control the control target device, to the control device, the image information generation module 350 generates image information to be displayed on the browser of the control device, and transmits the image information to the control module 340, and the control module 340 allows the Web server module 310 to transmit an HTML file, in which a script including the generated image information is described, to the control device.

If an event corresponding to the variation in status of the control target device occurs, and the event detection module 330 detects the event, the event detection module 330 transmits information about the detected event to the independent communication module 320. If it is determined that sound information related to the detected event exists, the independent communication module 320 notifies the control module 340 of the determination. The control module 340 directs the sound information generation module 360 to generate related sound information. The sound information generated by the sound information generation module 360 is transmitted to the independent communication module 320 through the control module 340. The independent communication module 320 transmits the generated sound information to the control device.

In this case, the independent communication module 320 can transmit sound information to the control device in such a way to one-sidedly transmit an audio file or a predefined sound effect. For example, when the independent communication module 320 is connected to the independent communication module of the control device through TCP connection, related audio information can be recorded in the payload of a Transmission Control Protocol (TCP) packet, and then the TCP packet can be transmitted to the control device. In the payload, information about the length of the payload, information about the format of sound information, for example, identification information indicating whether an audio file is to be transmitted, or whether a sound effect is to be transmitted, format information about an audio file, in the case of the audio file, the actual audio data, etc., can be recorded and transmitted.

Further, sound information about a sound effect predefined between the control device and the control target device, in addition to an audio file, can be transmitted to the control device, so that the control device can output a corresponding sound effect. Examples of the sound effect may include a warning sound output when a screen is changed, a system error sound, a notification sound effect, etc. In order to transmit a sound effect, the payload of the TCP packet can include identification information, indicating that sound information is related to a sound effect, and identification information, indicating related sound effects, which can be transmitted to the control device.

As described above, the sound information received from the independent communication module 320 of the control target device can be played by a software module that is installed in the control device and is capable of playing audio data.

Meanwhile, the independent communication module 320 transmits URL information, which is to be provided by the control target device, to the independent communication module of the control device, without transmitting information about an actual audio file or sound effect, thus transmitting the sound information, generated by the sound information generation module 360, to the control device. The control device can access a corresponding URL and obtain information about a related audio file or sound effect. For this, the HTTP GET protocol can be used.

Figure 4:
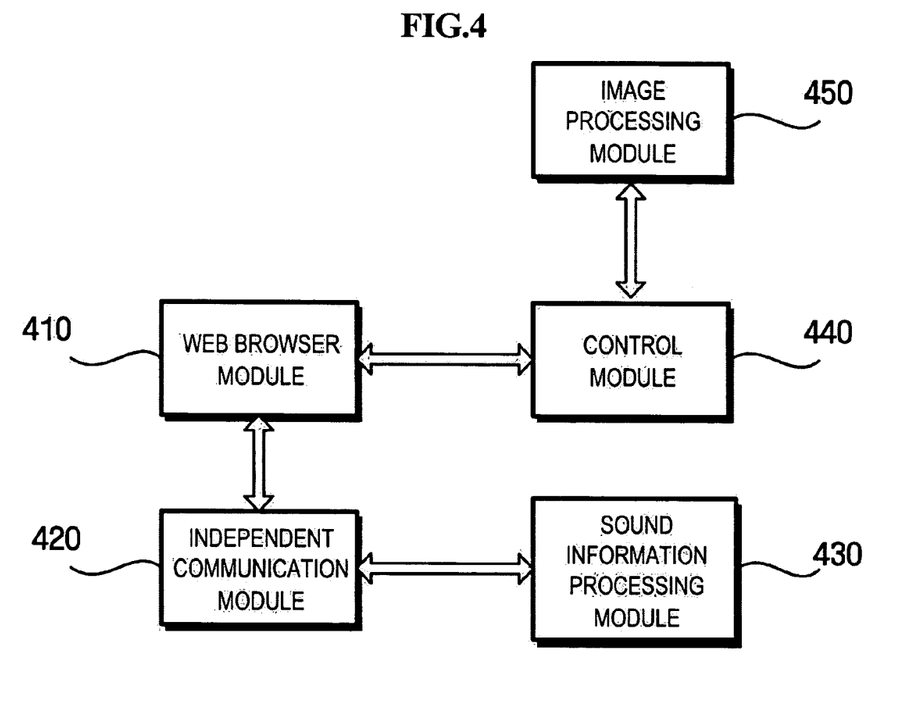
FIG. 4 is a block diagram showing the construction of a control device according to an exemplary embodiment of the present invention.

FIG. 4 is a block diagram showing the construction of a control device according to an exemplary embodiment of the present invention.

Referring to FIG. 4, the control device includes a Web browser module 410, an independent communication module 420, a sound information processing module 430, a control module 440, and an image processing module 450.

The Web browser module 410 performs data transmission or reception to or from the web server module 310 of the control target device, based on HTTP, interprets an HTML file in which a script, such as JavaScript, is described, and displays a user interface required to control the control target device on the display screen of the control device.

The independent communication module 420 communicates with the independent communication module 320 of the control target device, and can be implemented in the form of ActiveX in the case of the Internet Explorer browser, or in the form of a plug-in in cases other than the Internet Explorer browser, or can be implemented in the form of a native object. The independent communication module 420 receives sound information related to an event occurring in the control target device, and executes the sound information processing module 430 to play the sound information. Further, when the received sound information is URL information, the independent communication module 420 accesses a corresponding URL, and receives related information, based on the HTTP GET protocol.

The sound information processing module 430 plays the sound information received through the independent communication module 420. As an example of the sound information processing module 430, an audio data play module called by JavaScript or a general-purpose software module for playing audio data can be used.

Meanwhile, the independent communication module 420 can be operated in conjunction with a script, such as JavaScript that is described in a Web page provided by the Web server module of the control target device. The sound information processing module 430 can also be operated in conjunction with the independent communication module 420 in the Web browser module 410.

The control module 440 takes charge of the control of the entire control device, and the image processing module 450 processes image information received through the Web browser module 410.

If the control device receives a user interface required to control the control target device from the Web server module 310 of the control target device, the control module 440 allows the image processing module 450 to process image information necessary for the received user interface.

Meanwhile, if the independent communication module 420 receives sound information related to the event occurring in the control target device from the independent communication module of the control target device, the independent communication module 420 performs a corresponding operation depending on the format of the received sound information.

For example, if sound information is transmitted by being loaded into a TCP packet, the independent communication module 420 interprets the received TCP packet and extracts sound information from the TCP packet, and plays the received audio file using a native object or a plug-in capable of playing the sound file. In this case, the native object or the plug-in can function as the sound information processing module 430. Further, the independent communication module 420 stores the received audio file in a separate storage region of the control device, and notifies the sound information processing module 430 of the location at which the received audio file is stored, so that the sound information processing module 430 can play the stored audio file.

If the independent communication module 420 receives URL information from the control target device, the independent communication module 420 transmits the URL information to the sound information processing module 430, as described above, and the sound information processing module 430 accesses a corresponding URL, receives corresponding audio data from the URL using the HTTP GET protocol, and plays the audio data. Alternatively, the independent communication module 420 directly accesses the corresponding URL, and receives related sound information, such as a sound file, a sound effect, or a warning sound, using the HTTP GET protocol.

In this case, the independent communication module 420 can include a separate cache region, and can store a sound file related to a repeatedly and frequently occurring event in the cache region, thus efficiently utilizing network resources.

Meanwhile, the independent communication module 420 can receive sound information in XML format from the independent communication module of the control target device. Examples of the XML format are shown in FIGS. 5A and 5B.

Figure 5A:
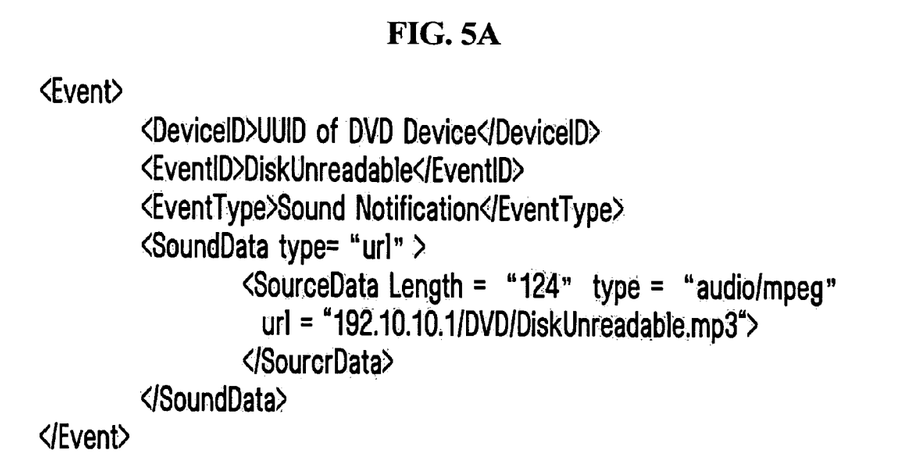
FIGS. 5A and 5B illustrate source code for expressing sound information in Extensible Markup Language (XML) format according to an exemplary embodiment of the present invention.

FIG. 5A illustrates the format of an XML document when the independent communication module 420 receives URL information. 'DeviceID' denotes identification information of the control target device, and a DVD player is shown as an example of the control target device. 'EventID' denotes the content of an occurring event. The case where a DVD is ejected is shown as an example of such an event. 'EventType' denotes the type of occurring event. An event related to sound information is shown as an example of the event type. 'SoundData' denotes actual sound information, and URL information is shown as an example of the sound information.

Therefore, if the independent communication module 420 of the control device accesses the URL '192.10.10.1', receives and stores the file 'DiskUnreadable.mp3' stored in a directory '/DVD', and notifies the sound information processing module 430 of information about the location at which the file is stored, the sound information processing module 430 plays the received file 'DiskUnreadable.mp3' using the location information.

Figure 5B:
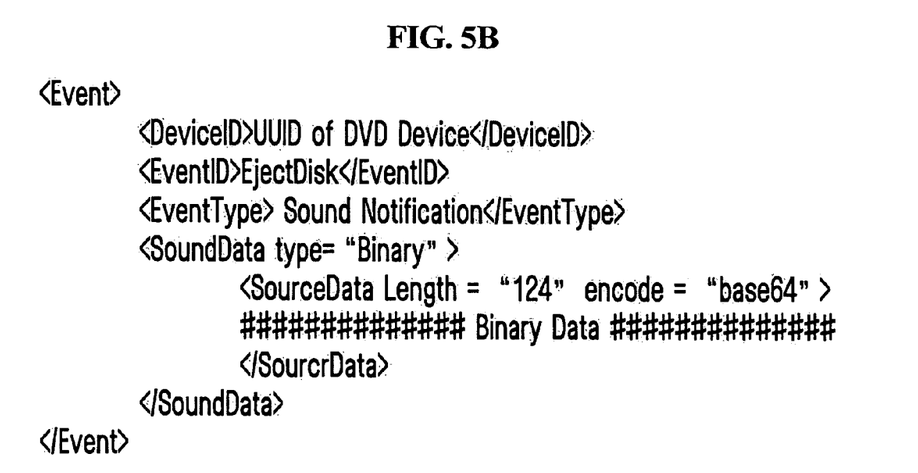

FIG. 5B illustrates the format of an XML document when the independent communication module 420 receives an XML document including binary data about sound information. In 'SoundData', binary data about sound is provided.

Therefore, if the independent communication module 420 of the control device stores the binary data in a temporal storage space, and notifies the sound information processing module 430 of information about the location at which the binary data is stored, the sound information processing module 430 plays the received binary data using the location information.

Meanwhile, when receiving information about a sound effect, the independent communication module 420 notifies the sound information processing module 430 of the information about the location of a sound effect-related file, stored in the local storage region of the control device, and the sound information processing module 430 plays the sound effect using the location information.

Figure 6:
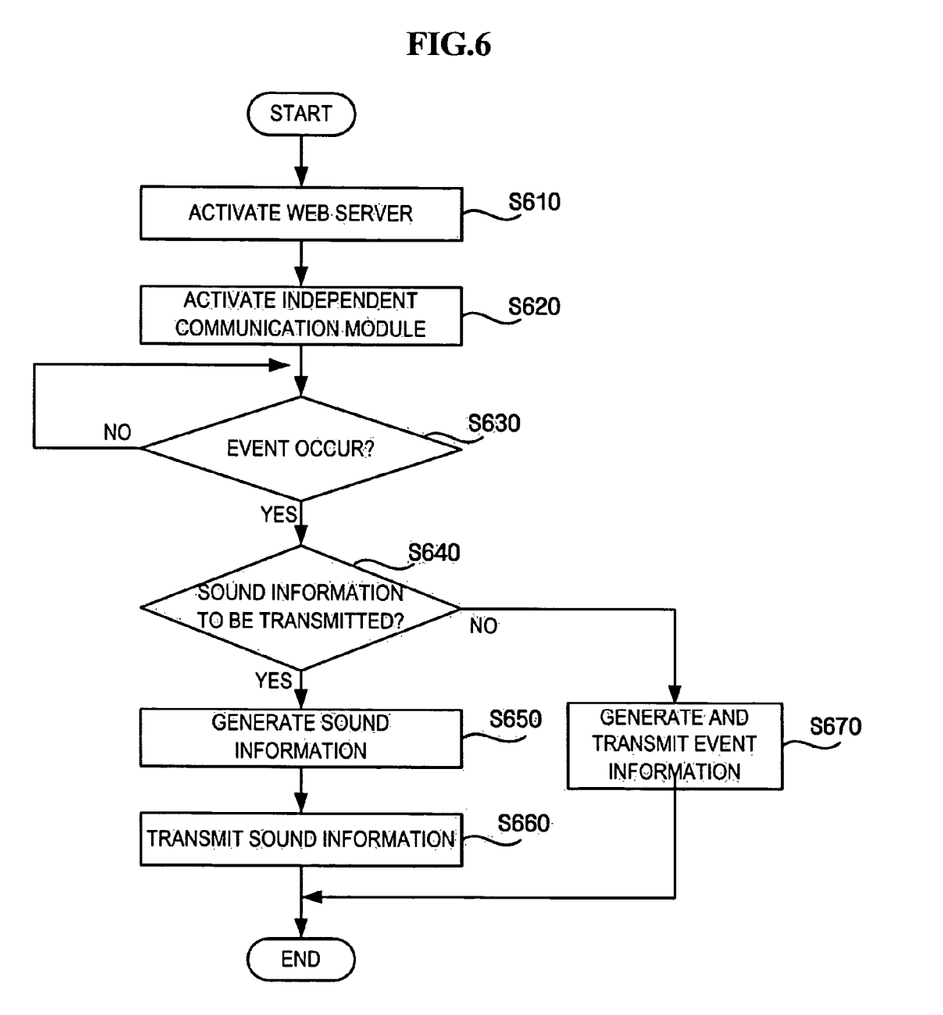
FIG. 6 is a flowchart showing the operation of a control target device according to an exemplary embodiment of the present invention.

FIG. 6 is a flowchart showing the operation of a control target device according to an exemplary embodiment of the control target device.

First, a Web server provided in the control target device is activated at step S610, and an independent communication module is activated to transmit information about an event occurring in the control target device to the control device at step S620.

Thereafter, if an event corresponding to the variation in status of the control target device occurs, whether sound information corresponding to the occurring event is to be transmitted to the control device is determined at steps S630 and S640. In this case, the determination of the occurrence of an event can be performed by the event detection module 330 shown in FIG. 3.

If it is determined that sound information must be transmitted to the control device, the sound information generation module 360 generates sound information at step S650, and the independent communication module 320 transmits the generated sound information to the control device at step S660. In this case, the independent communication module 320 can transmit information about a sound file or a sound effect, or information about a URL in which such information is stored.

If an event has occurred, but there is no need to transmit sound information, the independent communication module 320 can generate event information and transmit the occurring event information to the control device at step S670.

Figure 7:
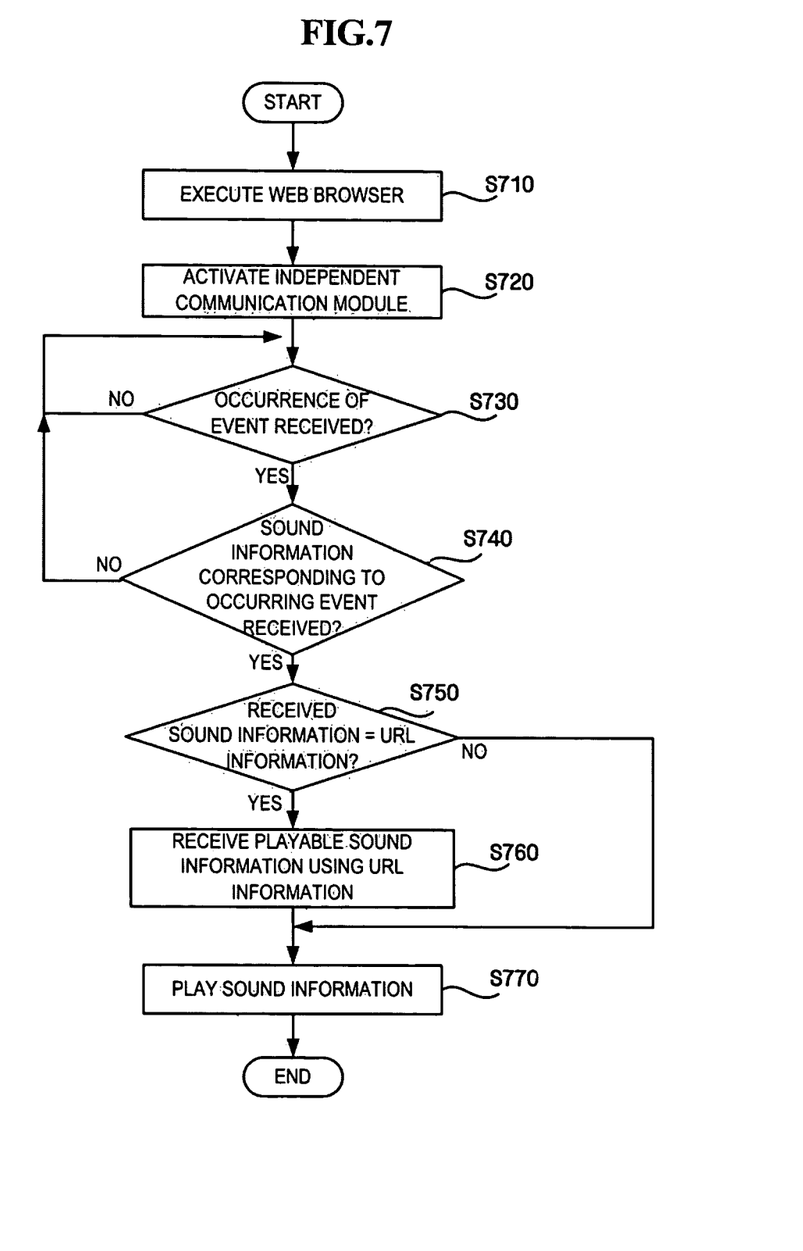
FIG. 7 is a flowchart showing the operation of a control device according to an exemplary embodiment of the present invention.

FIG. 7 is a flowchart showing the operation of a control device according to an exemplary embodiment of the present invention.

First, a Web browser installed in the control device is executed at step S710, and an independent communication module is activated to receive information about an event occurring in the control target device at step S720.

Thereafter, when the independent communication module receives event information from the control target device, whether sound information corresponding to the occurring event has been received is determined at steps S730 and S740.

If it is determined that sound information has been received, the independent communication module determines whether the received sound information is URL information at step S750. If the sound information is URL information, the independent communication module accesses the URL and receives information about a sound file or sound effect at step S760. If the sound file is received, the sound file is stored in the local storage region of the control device, and the stored sound file is played using a sound player program installed in the control device at step S770. If information about the sound effect is received, the independent communication module notifies the sound information processing module of the location of a sound effect file stored in the local storage region of the control device on the basis of the received information, and directs the sound information processing module to play the sound effect. Further, if URL information is received, the sound information processing module 430 can receive and play sound information using the received URL information.

As described above, the exemplary embodiments of the present invention can transmit an effect sound or a warning sound corresponding to the variation in status of a control target device to a user while the user controls the control target device using a control device, thus improving the utility of the control device.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A control target device comprising:
a Web server module which transmits to a control device a Web page that controls the control target device through a first communication channel established between the control target device and the control device;

a sound information generation module executed by a hardware processor which generates sound information in a web data format, where the sound information is a sound file or includes information about a sound file, and where the sound information is related to an event occurring according to a variation in a status of an operation of the control target device;

an event detection module, which detects the event occurring in the control target device; and an independent communication module which receives the event detected by the event detection module, determines whether the sound information related to the detected event exists, and if the independent communication module determines that the sound information exists, transmits to the control device the generated sound information through a second communication channel established between the control target device and the control device that is separate from the first communication channel and if the independent communication module determines that the sound information does not exist, transmits event information comprising at least one of an image and text data via the first communication channel.

2. The control target device of claim 1, wherein the sound information includes the sound file.

3. The control target device of claim 1, wherein the second communication channel is dedicated to providing the sound information using the sound file and wherein the independent communication module transmits the sound information with information about format of the sound information in a payload.

4. The control target device of claim 1, wherein the second communication channel is dedicated to the sound information corresponding to the events.

5. The control target device of claim 1, wherein the control target device is in same home network with the control device.

6. A control device comprising: a Web browser module which receives from a control target device a Web page that controls the control target device through a first communication channel established between the control target device and the control device;

an independent communication module which receives from the control target device sound information comprising a sound file or an Uniform Resource Locator (URL) information indicating a location of the sound file related to an event occurring in the control target device through a second communication channel established between the control target device and the control device that is separate from the first communication channel; and a sound information processing module executed by a hardware processor which plays a sound corresponding to the event using the received sound information, wherein the event is a change in status of an operation of the control target device and which is detected by the control target device, and wherein the control target device determines whether sound information related to the detected event exists in the control target device, wherein, if the control target device determines that the sound information related to the detected event exists in the control target device, the independent communication module of the control device receives the sound information from the control target device, and wherein, if the control target device determines that the sound information related to the detected event does not exist the control target device, the independent communication module of the control device receives event information comprising at least one of an image and text data via the first communication channel.

7. The control device of claim 6, wherein the independent communication module is called and operated by a script recorded in a Web browser provided by the Web browser module.

8. The control device of claim 6, wherein the sound information processing module is operated in conjunction with the independent communication module.

9. The control device of claim 6, wherein the sound information includes the sound file.

10. The control device of claim 6, wherein the sound information includes the URL information for providing information about the sound file.

11. The control device of claim 6, wherein the independent communication module is a plug-in, an ActiveX object, or a native object that plays sound under the control of the Web browser.

12. A method of transmitting sound information in a Web-based control system, comprising:

transmitting to a control device a Web page that controls a control target device through a first communication channel established between the control target device and the control device;

generating by a processor sound information comprising a sound file or a Uniform Resource Locator indicating a location of the sound file in a web data format, where the sound information is related to an event occurring according to a variation in a status of an operation of a control target device;

detecting the event occurring in the control target device;

determining whether the sound information related to the detected event exists;

transmitting to the control device the generated sound information based on the detected event through a second communication channel established between the control target device and the control device that is separate from the first communication channel when the determined sound information exists; and transmitting to the control device event information comprising at least one of an image and text data via the first communication channel when the determined sound information does not exist.

13. The sound information transmission method of claim 12, wherein the sound information includes the sound file.

14. The sound information transmission method of claim 12, wherein the sound information includes the URL information for providing information about a sound file.

15. A method of transmitting sound information in a Web-based control system, comprising:

receiving from a control target device a Web page that controls the control target device through a first communication channel established between the control target device and a control device;

receiving from the control target device sound information comprising a sound file or a Uniform Resource Location (URL) information indication a location of the sound file, wherein the sound information is related to an event occurring in the control target device, through a second communication channel established between the control target device and the control target that is separate from the first communication channel; and playing by a computer a sound corresponding to the event using the received sound information, wherein the event is a change in status of an operation of the control target device and is detected by the control target device, and wherein the control target devices determines if the sound information corresponding to the detected event exists, and if the sound information related to the detected event exists, the control target device generates the sound information for the transmission to the control device, and wherein if the control target device determines if the sound information corresponding to the detected event does not exist, the control device receives from the control target device event information comprising at least one of an image and text data via the first communication channel.

16. The sound information transmission method of claim 15, wherein the sound information includes the sound file.

17. The sound information transmission method of claim 15, wherein the sound information includes the URL information for providing information about the sound file or a sound effect and wherein the Web server module accesses the URL information to obtain the sound file or the sound effect via the second communication channel.

* * * * *